H. D. JAMES.
RHEOSTAT AND CONTROLLING DEVICE.
APPLICATION FILED MAR. 31, 1909.
925,341. Patented June 15, 1909.
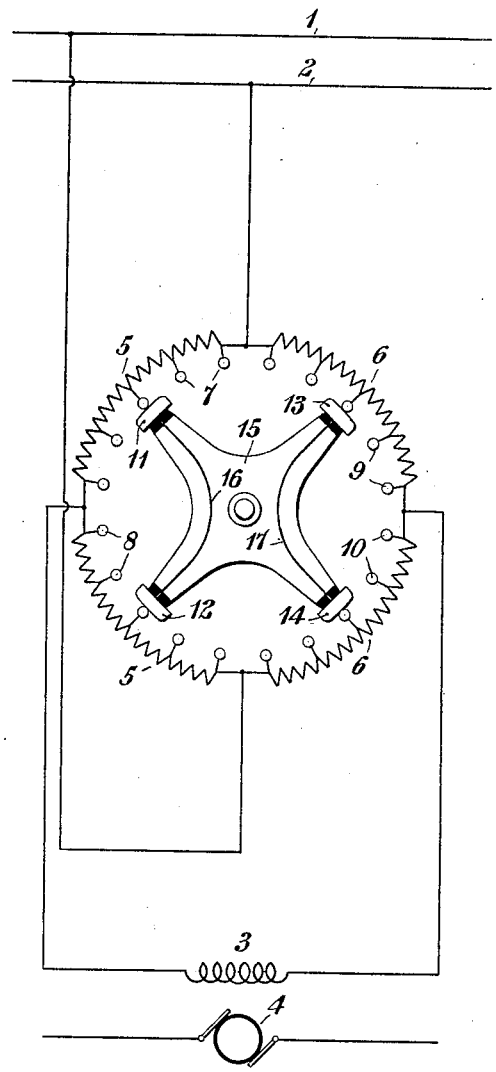
WITNESSES:
C. L. Belcher
Otto S. Schauer
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

RHEOSTAT AND CONTROLLING DEVICE.

No. 925,341.     Specification of Letters Patent.     Patented June 15, 1909.

Original application filed October 3, 1906, Serial No. 337,279. Divided and this application filed March 31, 1909. Serial No. 486,895.

*To all whom it may concern:*

Be it known that I, HENRY D. JAMES, a citizen of the United States, and a resident of Pittsburg, in the county of Allegheny and State of Pennsylvania, have invented a new and useful Improvement in Rheostats and Controlling Devices, of which the following is a specification, this being a division of my application Serial No. 337,279, filed October 3, 1906.

My invention relates to rheostats and controlling devices for electrical circuits, and it has for its object to provide simple and effective means for governing the value and direction of the drop of potential in a circuit.

Electric motors are frequently governed in speed and direction of rotation by adjusting the voltages applied to the armature circuits thereof, and the direction of current flow in the circuits. One method of effecting the said adjustments consists in altering the strength and polarity of the field of a generator that supplies the armature circuit of a motor, the field strength being altered by varying the amount of resistance in the field circuit, and the polarity of the field being altered by reversing the direction of the drop of potential in the field circuit.

According to the present invention, the means for adjusting the amount of effective resistance in the field circuit is so constructed and arranged that it may also be employed to reverse the direction of the drop of potential in the circuit without interruption thereof and without injury or shock to the machine.

The single figure of the accompanying drawing is a diagrammatic view of a controller that is constructed and arranged in circuit in accordance with my invention.

The terminals of a distributing circuit 1—2, which may comprise the field magnet winding 3 of a dynamo-electric machine 4, are connected to the respective middle points of subdivided resistances 5 and 6, the points of subdivision of one-half of the resistance 5 being connected to a set of terminals 7, and those of the other half to another set of contact terminals 8, while the points of subdivision of one-half of the resistance 6 are connected to a set of contact terminals 9, and those of the other half to another set of contact terminals 10. The sets of contact terminals 7 to 10, inclusive, are engaged, respectively, by brushes 11, 12, 13 and 14 that are carried at the extremities of a four-armed movable member 15, the brushes 11 and 12 being connected by means of a conductor 16, and brushes 13 and 14 by means of a conductor 17. The conductors 16 and 17 constitute shunts for the portions of the resistances 5 and 6 that are included between the respective pairs of brushes 11—12 and 13—14.

When the controller member 15 occupies the position shown, the brushes carried thereby engage the contact terminals that are connected to the middle points of the respective halves of the resistances 5 and 6. Then, since the brushes 11 and 13 are connected to equi-potential points of the resistances 5 and 6 and also to brushes 12 and 14, no difference of potential will exist between the terminals of the field magnet winding 3. If, however, the member 15 is moved in a clockwise direction, the brushes 11 and 13, and also 12 and 14, will be connected to points of the resistances 5 and 6 that differ in potential and the points of the resistances to which the terminals of the field magnet winding 3 are connected will be caused to differ in potential. The winding then becomes energized, the voltage applied thereto increasing as the controller member 15 approaches the limit of its movement in a clockwise direction. If the controller member 15 is moved from the position shown, in a counter-clockwise direction, the brushes 11 and 13, and also the brushes 12 and 14, will again become connected to points of resistances 5 and 6 that differ in potential, and, consequently, the middle points of the resistances, to which the terminals of the field magnet winding 3 are connected, will differ in potential and the field magnet winding will become energized, the direction of current flow therein being reversed. The value of the difference of potential may be increased as the controller member 15 is continued in its movement in the counter-clockwise direction.

While specific means have been shown and described, it will, of course, be understood that the invention is not limited in scope to such specific means, or to the specific application which has here been illustrated and described, and I consequently desire that it be construed to cover all such modified devices and arrangements of circuits as do not materially alter the mode of operation.

I claim as my invention:

1. The combination with a supply circuit and two resistances connected in parallel relation thereto, of a distributing circuit the terminals of which are connected to the respective resistances, and movable shunts for portions of the resistances each of which extends only between points of the same resistance.

2. The combination with a supply circuit and two resistances connected in parallel relation thereto, of a distributing circuit the terminals of which are connected to the respective resistances, and movable shunts for portions of the resistances each of which extends only between points of the same resistance that are upon opposite sides of the connections of the distributing circuit thereto.

3. The combination with a supply circuit and two resistances connected in parallel relation thereto, of a distributing circuit the terminals of which are connected to the respective resistances, shunts for portions of the resistances each of which extends only between points of the same resistance, and means for moving the said shunts along the resistances toward opposite terminals thereof.

4. The combination with a supply circuit and two resistances connected in parallel relation thereto, of a distributing circuit the terminals of which are connected to the respective resistances, shunts for portions of the resistances each of which extends only between points of the same resistance that are upon opposite sides of the connections of the distributing circuit thereto, and means for moving the said shunts along the resistances toward opposite terminals thereof.

5. The combination with a supply circuit and two resistances connected in parallel relation thereto, of a distributing circuit the terminals of which are connected to the respective resistances, and movable shunts for one half of each of the resistances.

6. The combination with a supply circuit and two resistances connected in parallel relation thereto, of a distributing circuit the terminals of which are connected to the respective resistances, and movable shunts for one half of each of the resistances, the said shunts extending between the points of the resistances that are located upon opposite sides of the connections of the distributing circuit thereto.

7. The combination with a supply circuit and two resistances connected in parallel relation thereto, of a distributing circuit the terminals of which are connected to the respective resistances, and shunts for one half of each of the resistances that are movable along the same respectively toward opposite terminals thereof.

8. The combination with a supply circuit and two resistances connected in parallel relation thereto, of a distributing circuit the terminals of which are connected to the respective resistances, shunts for one half of each of the resistances that extend between points of the resistances located upon opposite sides of the connections of the distributing circuit thereto, and means for moving the shunts along the resistances toward opposite terminals thereof.

In testimony whereof, I have hereunto subscribed my name this 27th day of March, 1909.

HENRY D. JAMES.

Witnesses:
Ross W. Copeland,
B. B. Hines.